(12) United States Patent
Harada et al.

(10) Patent No.: US 8,051,646 B2
(45) Date of Patent: Nov. 8, 2011

(54) PARTICULATE FILTER REGENERATING SYSTEM

(75) Inventors: Koichiro Harada, Hiroshima (JP);
Hiroshi Yamada, Hiroshima (JP);
Akihide Takami, Hiroshima (JP)

(73) Assignee: Mazda Motor Corporation (JP)

( * ) Notice: Subject to any disclaimer, the term of this patent is extended or adjusted under 35 U.S.C. 154(b) by 238 days.

(21) Appl. No.: 12/502,728

(22) Filed: Jul. 14, 2009

(65) Prior Publication Data

US 2010/0018190 A1    Jan. 28, 2010

(30) Foreign Application Priority Data

Jul. 23, 2008    (JP) ................. 2008-189533

(51) Int. Cl.
*F01N 3/00*    (2006.01)
(52) U.S. Cl. .............. 60/295; 60/285; 60/297
(58) Field of Classification Search .............. 60/285, 60/297, 295
See application file for complete search history.

(56) References Cited

U.S. PATENT DOCUMENTS

| | | | |
|---|---|---|---|
| 5,319,930 | A | 6/1994 | Shinzawa et al. |
| 7,153,342 | B2 | 12/2006 | Koga et al. |
| 7,254,940 | B2 | 8/2007 | Saitoh et al. |
| 2003/0131592 | A1 | 7/2003 | Saito et al. |
| 2004/0172933 | A1 | 9/2004 | Saito et al. |
| 2006/0048507 | A1 | 3/2006 | Tochikawa et al. |
| 2006/0059901 | A1* | 3/2006 | Saito et al. ............ 60/297 |
| 2007/0056273 | A1 | 3/2007 | Wills |

FOREIGN PATENT DOCUMENTS

| | | |
|---|---|---|
| EP | 1 437 486 A1 | 7/2004 |
| EP | 1 455 070 A2 | 9/2004 |

(Continued)

OTHER PUBLICATIONS

Extended European Search Report dated Oct. 30, 2009; Application No. 09009110.9-2311.

(Continued)

*Primary Examiner* — Thomas Denion
*Assistant Examiner* — Michael Carton
(74) *Attorney, Agent, or Firm* — Studebaker & Brackett PC; Donald R. Studebaker

(57) ABSTRACT

Disclosed is a particulate filter regenerating system which comprises a fuel injection device (7) adapted to inject fuel into a combustion chamber of an engine body (1), and an exhaust gas temperature-adjusting device (33) adapted, when a PM deposit amount which is an amount of particulate matter (PM) deposited in a DPF (particulate filter) 13 provided in an exhaust passage of an engine, reaches a predetermined value X, to cause the fuel injection device (7) to perform a post-injection for injecting fuel into the combustion chamber during an expansion stroke of the engine, so as to execute a filter regeneration process of raising a temperature of exhaust gas flowing into the DPF 13 to burn the deposited PM. The exhaust gas temperature-adjusting device (33) is operable to cause the fuel injection device (7) to stop performing the post-injection in a stage where a PM burning amount which is an amount of PM burned through the filter regeneration process, is less than an initial PM deposit amount which is the PM deposit amount X at a timing of initiation of the filter regeneration process, by a predetermined amount. The particulate filter regenerating system of the present invention can adequately burn and remove PM deposited in a particulate filter, by means of a post-injection of fuel, while effectively suppressing a fuel consumption due to the post-injection.

4 Claims, 6 Drawing Sheets

FOREIGN PATENT DOCUMENTS

| | | |
|---|---|---|
| EP | 1 840 348 A1 | 10/2007 |
| FR | 2 801 636 B1 | 3/2002 |
| FR | 2 923 531 A1 | 5/2009 |
| JP | 5-240026 A | 9/1993 |
| JP | 2001-254616 A | 9/2001 |
| JP | 2001-303980 A | 10/2001 |
| JP | 2004-162633 A | 6/2004 |
| JP | 2005-090391 A | 4/2005 |
| JP | 2005-291198 A | 10/2005 |
| JP | 2006-144658 A | 6/2006 |
| JP | 2007-154729 A | 6/2007 |
| JP | 2008-014181 A | 1/2008 |
| JP | 2008-106614 A | 5/2008 |

OTHER PUBLICATIONS

Japanese Office Action "Notice of Reasons for Rejection" dated Jul. 27, 2010; Japanese Patent Application No. 2008-189533 with English Translation.

* cited by examiner

PARTICULATE FILTER REGENERATING SYSTEM

BACKGROUND OF THE INVENTION

1. Field of the Invention

The present invention relates to a particulate filter regenerating system which comprises a fuel injection device adapted to inject fuel into a combustion chamber of an engine, and an exhaust gas temperature-adjusting device adapted, when a PM deposit amount which is an amount of particulate matter (PM) deposited in a particulate filter provided in an exhaust passage of the engine, reaches a predetermined value, to cause the fuel injection device to perform a post-injection for injecting fuel into the combustion chamber during an expansion stroke of the engine, so as to execute a filter regeneration process of raising a temperature of exhaust gas flowing into the particulate filter to burn the deposited PM.

2. Description of the Background Art

In a diesel engine and a lean-burn gasoline engine, particulate (particulate matter: PM) consisting primarily of carbonaceous components is contained in exhaust gas at higher levels as compared with a normal gasoline engine configured to perform combustion of an air-fuel mixture around a stoichiometric air/fuel ratio. For this reason, in the diesel engine or the lean-burn gasoline engine, there has heretofore been employed a technique of arranging a particulate filter in an exhaust passage of the engine to trap PM, and, when a predetermined amount of PM is accumulated or deposited in the particulate filter, executing a filter regeneration process for burning and removing the deposited PM.

Generally, the filter regeneration process is achieved by performing a so-called post-injection for injecting fuel into a combustion chamber during an expansion stroke of the engine. More specifically, through the post-injection, fuel components are added into exhaust gas, and burned in an oxidation catalyst or the like arranged upstream of the particulate filter, so that exhaust gas raised to high temperature flows into the particulate filter, and thereby the deposited PM is burned and removed based on functions of the high-temperature exhaust gas and a catalyst supported on the particulate filter.

As an exhaust gas purification system for an engine employing the above filter regeneration technique, there has been known one type as disclosed, for example, in JP 2004-162633A. Specifically, an exhaust gas purification system disclosed in this patent document is configured as follows. When it is determined that a difference between respective pressures detected by upstream and downstream pressure sensors provided across a particulate filter is equal to or greater than a predetermined value (i.e., the particulate filter is clogged), a post-injection (after-injection) is performed in an earlier-stage regeneration mode. Then, when a difference between respective exhaust gas temperatures before and after the particulate filter becomes equal to or less than a reference temperature difference after a predetermined time has elapsed from initiation of the post-injection in the earlier-stage regeneration mode, a post-injection mode is shifted from the earlier-stage regeneration mode to a later-stage regeneration mode. Upon the shifting to the later-stage regeneration mode, a fuel injection amount for the post-injection (post-injection amount) is reduced, or a fuel injection timing during the post-injection (post-injection timing) is advanced, as compared with that in the earlier-stage regeneration mode, to suppress a rise in exhaust gas temperature.

In the technique of the above patent document, when a difference between respective exhaust gas temperatures before and after the particulate filter becomes smaller to cause the shifting to the later-stage regeneration mode, a rise in exhaust gas temperature is suppressed by reducing the post-injection amount or advancing the post-injection timing. This provides an advantage of being able to prevent thermal damage of the particulate filter, and thermal degradation of oxidation catalyst supported on the particulate filter.

However, in the later-stage regeneration mode where the post-injection amount is reduced (or the post-injection timing is advanced), although an excessive rise in exhaust gas temperature can be suppressed, a PM burning rate becomes lower along with a reduction in exhaust gas temperature, and thereby, if the later-stage regeneration mode is continued until PM deposited in the filter is completely burned and removed, a process time in the later-stage regeneration mode is increased to cause an increase in total fuel consumption due to the post-injection, which is likely to result in deterioration in fuel economy performance.

SUMMARY OF THE INVENTION

In view of the above circumstances, it is an object of the present invention to provide a particulate filter regenerating system capable of adequately burning and removing PM deposited in a particulate filter, by means of a post-injection of fuel, while effectively suppressing a fuel consumption due to the post-injection.

In order to achieve this object, the present invention provides a particulate filter regenerating system which comprises a fuel injection device adapted to inject fuel into a combustion chamber of an engine, and an exhaust gas temperature-adjusting device adapted, when a PM deposit amount which is an amount of particulate matter (PM) deposited in a particulate filter provided in an exhaust passage of the engine, reaches a predetermined value, to cause the fuel injection device to perform a post-injection for injecting fuel into the combustion chamber during an expansion stroke of the engine, so as to execute a filter regeneration process of raising a temperature of exhaust gas flowing into the particulate filter to burn the deposited PM. The exhaust gas temperature-adjusting device is operable to cause the fuel injection device to stop performing the post-injection in a stage where a PM burning amount which is an amount of PM burned through the filter regeneration process is less than an initial PM deposit amount which is the PM deposit amount at a timing of initiation of the filter regeneration process, by a predetermined amount.

DESCRIPTION OF THE PREFERRED EMBODIMENTS

Figure 1:
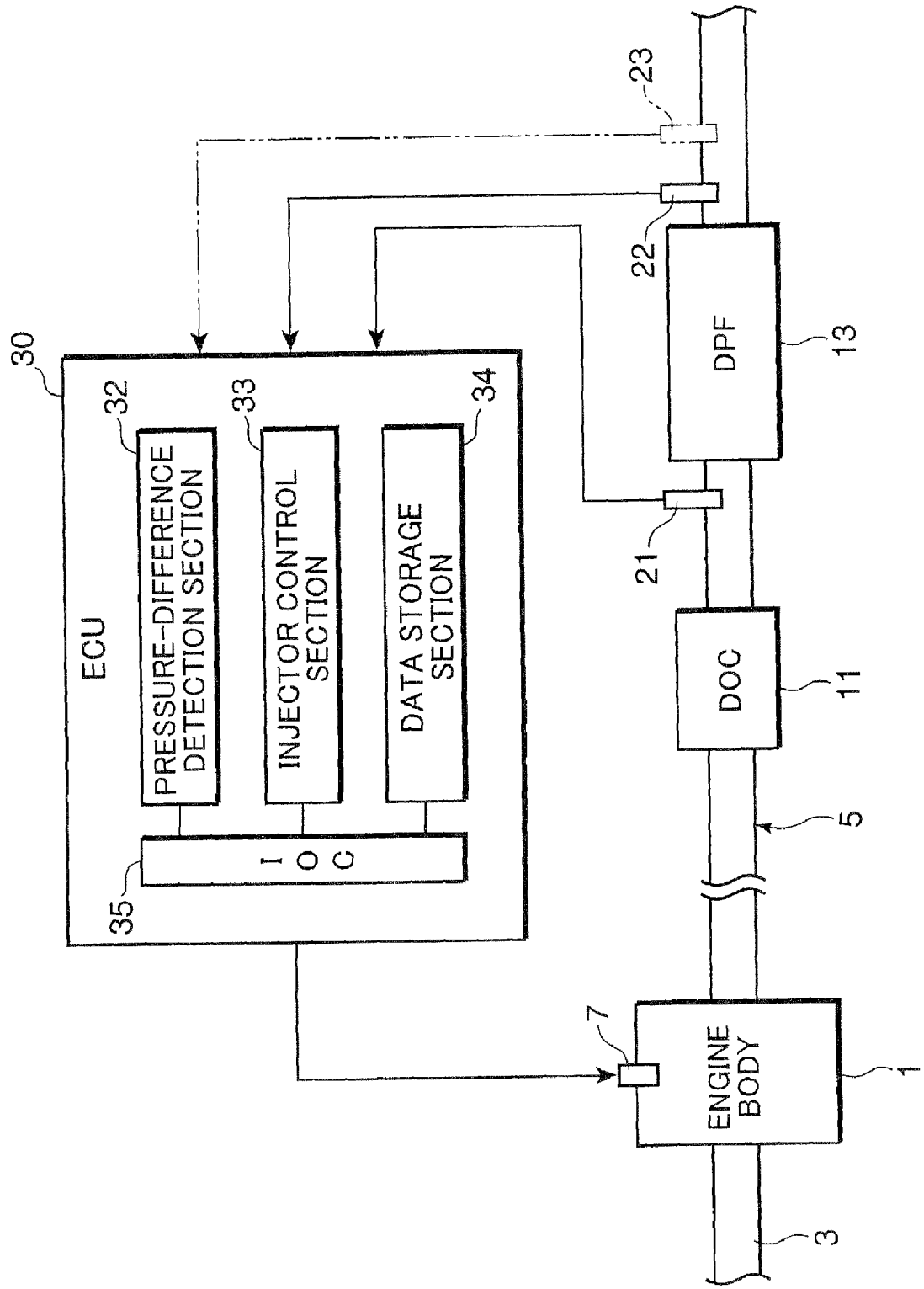
FIG. 1 is a schematic diagram showing a general configuration of an engine employing a particulate filter regenerating system according to one embodiment of the present invention.

FIG. 1 is a schematic diagram showing a general configuration of an engine employing a particulate filter regenerating system according to one embodiment of the present invention. The engine illustrated in FIG. 1 comprises an engine body 1 having a piston and a cylinder, an intake passage 3 for supplying combustion air to the engine body 1 therethrough, and an exhaust passage 5 serving as a passage for exhaust gas discharged from the engine body 1. The engine body 1 is provided with an injector 7 (which corresponds to a fuel injection device set forth in the appended claims) adapted to inject fuel supplied from a fuel tank (not shown), directly into a combustion chamber of the engine body 1. This embodiment will be described on an assumption that the engine is a diesel engine, and thereby the injector 7 is adapted to inject light oil as fuel therefrom.

A diesel oxidation catalyst (oxidation catalyst) 11 and a diesel particulate filter (particulate filter) 13 are interposed in the exhaust passage 5, in this order from an upstream side in a flow direction of exhaust gas. In the following description, the diesel oxidation catalyst 11 will be referred to as "DOC 11", and the diesel particulate filter 13 will be referred to as "DPF 13".

Further, the exhaust passage 5 has a first pressure sensor 21 which is provided between the DPF 13 and the DOC 11 located upstream of the DPF 13, and adapted to detect a pressure of exhaust gas flowing on an upstream side of the DPF 13, and a second pressure sensor 22 which is provided downstream of the DPF 13, and adapted to detect a pressure of exhaust gas after passing through the DPF 13.

Although not illustrated in detail, the DOC 11 is a type in which an oxidation catalyst is supported on a surface of a substrate composed, for example, of a honeycomb structural body made of cordierite and formed to have a large number of cells extending along an exhaust gas flow. The DOC 11 has a function of purifying HC (hydrocarbon) and CO (carbon monoxide) by an oxidation reaction.

Figure 2:
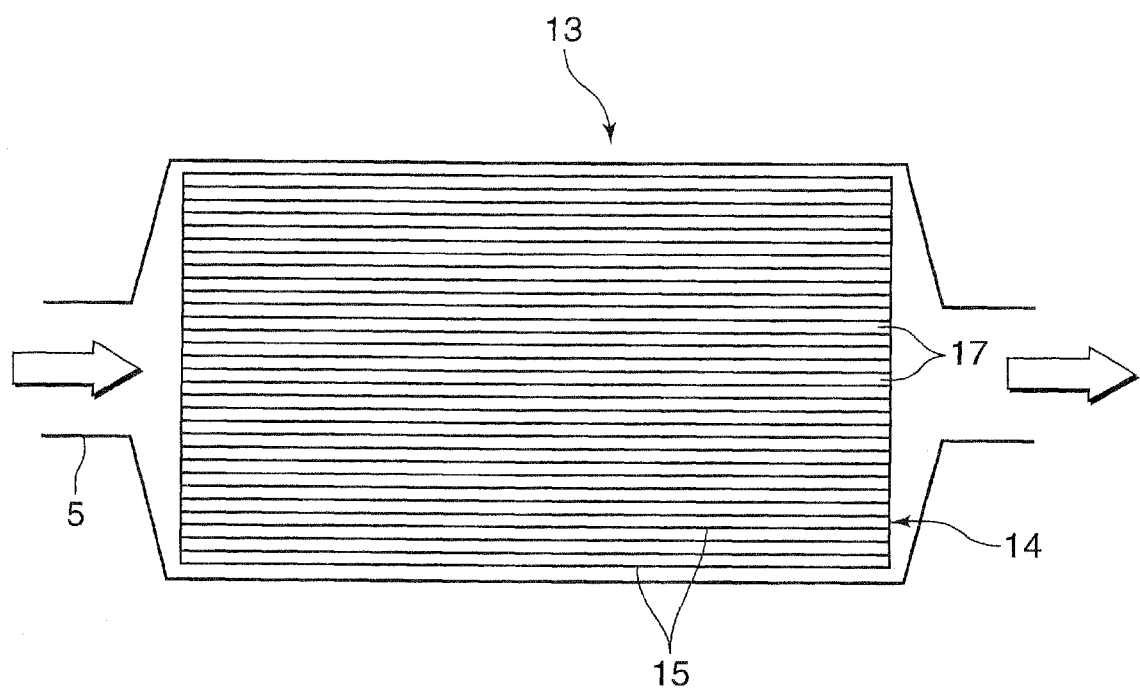
FIG. 2 is an explanatory schematic diagram showing a structure of a DPF (diesel particulate filter).

For example, as shown in FIG. 2, the DPF 13 comprises a substrate composed of a honeycomb structural body made of silicon carbide and formed to have a large number of cells 17 defined by a porous cell wall 15 in such a manner as to extend along the exhaust gas flow, wherein an after-mentioned PM oxidation catalyst is supported on the cell wall 15 of the substrate 14. The cells 17 have a group of inlets and a group of outlets, which are alternately sealed by respective ones of a large number of sealing members (not shown). The DPF 13 configured as above has a function of purifying HC and CO while trapping particulate matter (hereinafter abbreviated as "PM") contained in exhaust gas.

Figure 3:
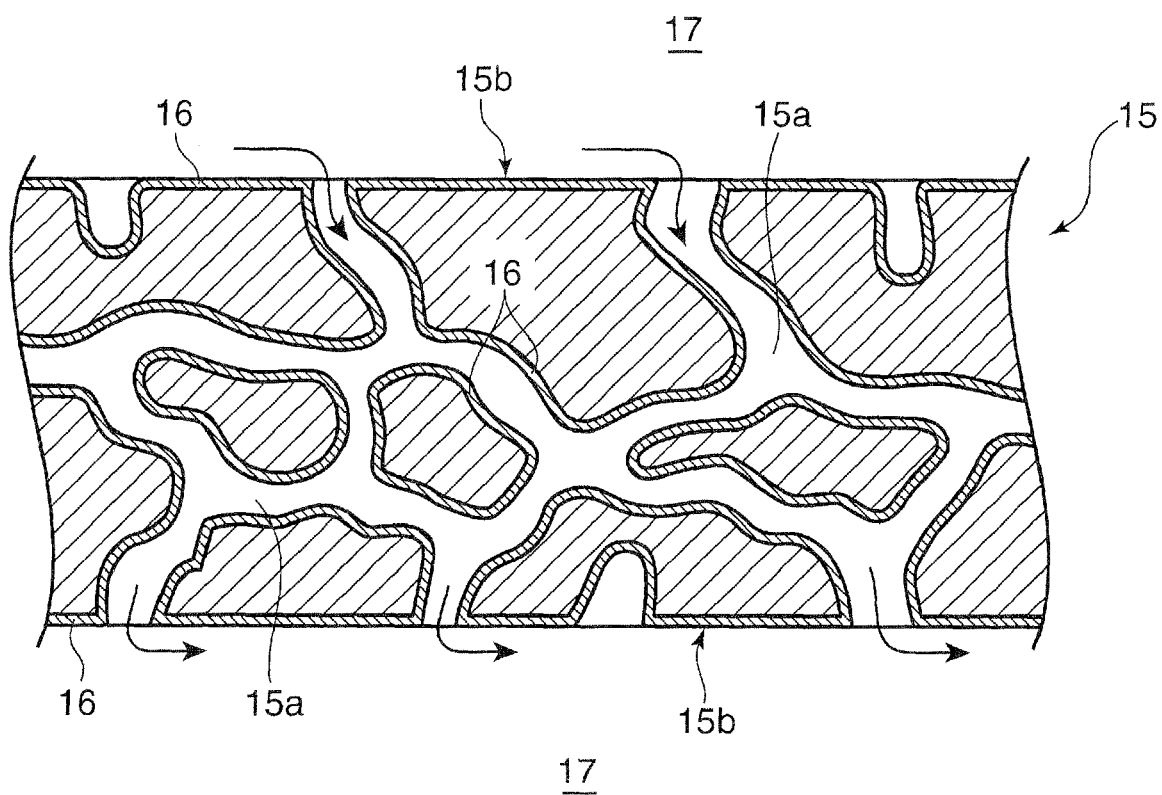
FIG. 3 is an enlarged sectional view specifically showing a structure of a cell wall of the DPF.

FIG. 3 is a sectional view enlargedly showing the cell wall 15 of the DPF 13. The cell wall 15 is made of a porous material having a large number of pores 15a, wherein a wall surface defining the pores 15a and an outer surface 15b of the cell wall 15 are coated with (supports) a PM oxidation catalyst layer 16 which is a layer of a PM oxidation catalyst comprising an oxide, such as alumina or Zr-based composite oxide, and a noble metal, such as Pt (platinum), loaded on the oxide. In the following description, the pores 15a of the cell wall 15 will be referred to as "cell-wall pores 15a", and the outer surface 15b of the cell wall 15 will be referred to as "cell-wall outer surface 15b".

Exhaust gas after flowing in each of the cells 17 of the DPF 15 passes through the cell-wall pores 15a in such a manner as to be distributed to two or more of the remaining cells 17. Through the distribution of exhaust gas, PM contained in the exhaust gas is trapped within the cell-wall pores 15a and on the cell-wall outer surface 15b.

A control system of the engine will be described below. In this embodiment, the engine is provided with an electronic control unit (ECU) 30 which is made up of conventionally well-known components, such as a central processing unit (CPU) and various memories to generally control an operation of the engine. Specifically, the ECU 30 is adapted to receive state quantities detected by various sensors, such as the first and second pressure sensors 21, 22, an airflow sensor, and a throttle opening angle sensor, in the form of an electric signal, and execute various control operations, such as an operation of controlling an amount of fuel to be injected from the injector 7, based on various control information obtained from the received signals.

The ECU 30 has, as primary functional elements, a pressure-difference detection section 32, an injector control section 33, a data storage section 34, and an input/output controller (IOC) 35.

The pressure-difference detection section 32 is designed to calculate a difference between respective pressure detection values from the first and second pressure sensors 21, 22 to detect a difference between respective pressures of exhaust gases flowing on the upstream side and on the downstream side of the DPF 13. In the following description, a difference between respective exhaust gas pressures on the upstream and downstream sides of (i.e., before and after) the DPF 13 will be referred to as "DPF pressure difference" or "pressure difference across the DPF 13".

The injector control section 33 is designed to control an amount of fuel to be injected from the injector 7 (fuel injection amount) and a timing of the fuel injection (fuel injection timing). Particularly, in this embodiment, the injector control section 33 is adapted, when a DPF pressure difference detected by the pressure-difference detection section 32 reaches a predetermined value, to cause the injector 7 to perform a so-called post-injection for injecting fuel during an expansion stroke of the engine, in addition to execution of a normal fuel injection control for causing the injector 7 to inject fuel at a timing around a top dead center (TDC) of a compression stroke of the engine.

The post-injection is performed to raise an exhaust gas temperature to burn PM accumulated or deposited in the DPF 13. More specifically, when the DPF pressure difference reaches the predetermined value, and it is determined that the DPF 13 is getting clogged, the post-injection is performed to burn and remove PM deposited in the DPF 13 so as to regenerate the DPF 13.

In particular, as a result of the post-injection, exhaust gas contains an increased amount of unburned fuel components, and the unburned fuel components undergo an oxidation reaction in the DOC (diesel oxidation catalyst) 11 in the exhaust passage 5, so that exhaust gas is raised to a high temperature. Then, based on functions of the resulting high-temperature exhaust gas and the PM oxidation catalyst layer 16 of the DPF 13, PM deposited in the DPF 13 is subjected to an oxidation reaction (burned), and removed (eliminated). As above, in this embodiment, an exhaust gas temperature-adjusting device set forth in the appended claims is made up of the injector control section 33 which is adapted, when an pressure difference across the DPF 13 reaches a predetermined value, to cause the injector 7 to perform the post-injection so as to raise an exhaust gas temperature to burn PM deposited in the DPF 13.

The data storage section 34 stores therein threshold-value data for allowing the injector control section 33 to determine a timing of initiating or stopping the post-injection, and other data. The timing of initiating or stopping the post-injection is determined based on a DPF pressure difference detected by the pressure-difference detection section 32, as described in detail later. Thus, the data storage section 34 stores therein threshold-value data for determination on whether a value or a reduction rate of the DPF pressure difference reaches a threshold value at which the post-injection is to be initiated or stopped, and other data. In this case, the threshold value varies depending on an operating condition of the engine. Thus, the threshold-value data is stored in the data storage section 34 in the form of map data prepared on an operating condition-by-operating condition basis.

The IOC 35 is designed to control data transmitting/receiving (data communication) between respective ones of the pressure-difference detection section 32, the injector control section 33 and the data storage section 34, and data communication between each of the sections 32 to 34 and each of the pressure sensors 21, 22 and the injector 7.

Figure 4:
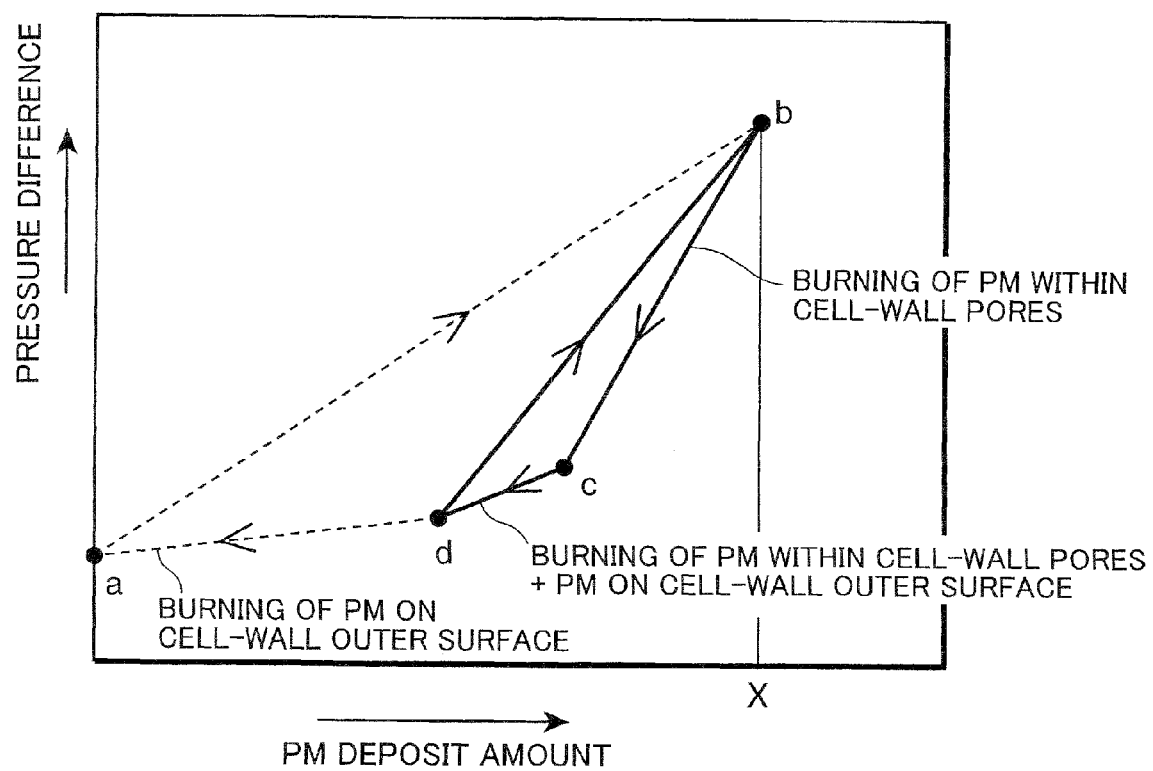
FIG. 4 is a graph showing a change in each of a DPF pressure difference and a PM deposit amount, along with a filter regeneration process.
Figure 5:
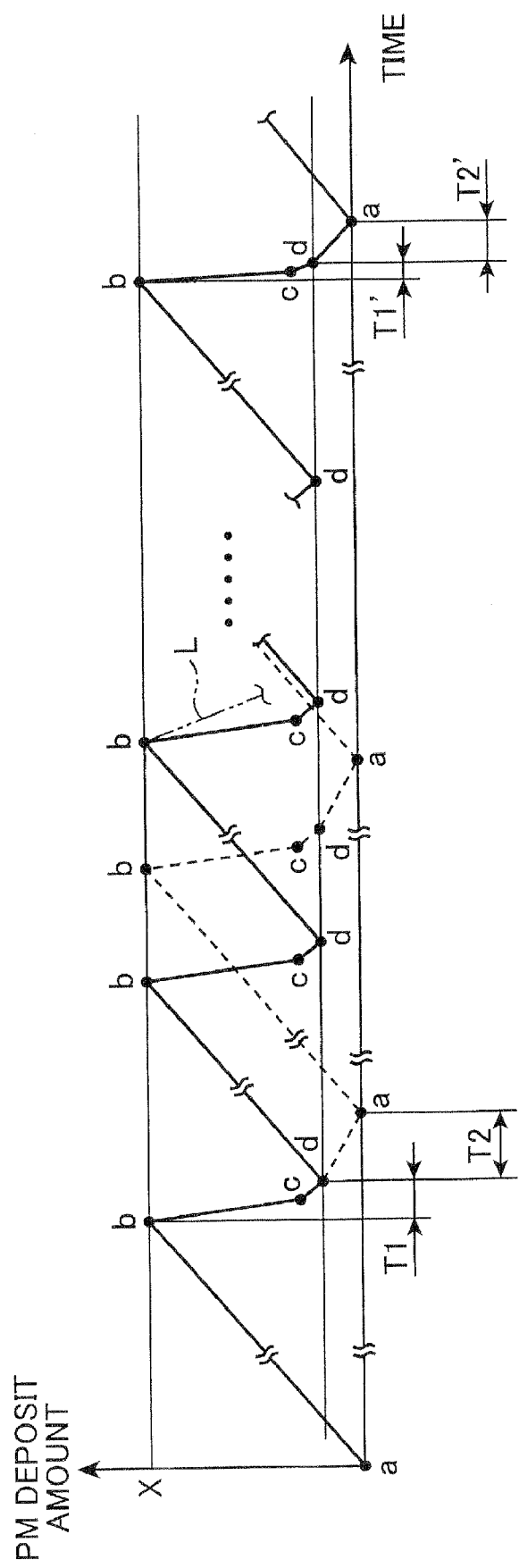
FIG. 5 is a graph showing a temporal change in PM deposit amount, along with the filter regeneration process.

With reference to the graphs in FIGS. 4 and 5, how a regeneration process of the DPF 13 (hereinafter referred to as "filter regeneration process") based on the post-injection is executed will be specifically described. FIG. 4 is a graph showing a change in each of a DPF pressure difference and a PM deposit amount, during a course where PM is deposited in the DPF 13, and the deposited PM is burned and removed by means of the post-injection. FIG. 5 is a graph showing a temporal change in state of the above DPF 13.

The point a in FIGS. 4 and 5 indicates an initial state when no PM is deposited in the DPF 13. When an operation of the engine is started in the initial state indicated by the point a, and exhaust gas discharged from the engine body 1 continuously passes through the DPF 13, PM contained in the exhaust gas is gradually deposited in the DPF 13, and consequently a pressure difference across the DPF 13 (DPF pressure difference) is gradually increased (see the stage from the point a to the point b). Then, when an amount of the deposited PM (PM deposit amount) reaches a predetermined value X, and the DPF 13 is placed in a state indicated by the point b, the post-injection is initiated in response to a determination that it is necessary to burn and remove the deposited PM.

After the initiation of the post-injection, the PM deposited in the DPF will be gradually burned and removed. However, it is considered that, in a certain period of time after the initiation of the post-injection, PM deposited within the cell-wall pores 15a illustrated in FIG. 3 is primarily burned, whereas PM deposited on the cell-wall outer surface 15b is relatively hard to be burned. The reason is that, comparing between the cell-wall outer surface 15b and the cell-wall pores 15a, the latter has an overwhelmingly larger surface area, and a larger support amount of the PM oxidation catalyst layer 16, i.e., the latter has a larger contact area between the deposited PM and the oxidation catalyst. The stage from the point b to the point c in FIGS. 4 and 5 represents a step of primarily burning and removing the PM within the cell-wall pores 15a in the above manner.

Then, after completion of burning of most of the PM within the cell-wall pores 15a, the PM deposited on the cell-wall outer surface 15b starts burning. The stage from the point c to the point d in FIG. 4 represents a step of simultaneously burning and removing a small amount of PM remaining within the cell-wall pores 15a and a part of the PM deposited on the cell-wall outer surface 15b. In this stage c→d, the PM on the cell-wall outer surface 15b which is relatively hard to promote an oxidation reaction, is partly burned. Thus, a change in the DPF pressure difference during the stage c→d becomes moderate as compared with that during the stage b→c where the PM within the cell-wall pores 15a is primarily burned.

The point d in FIGS. 4 and 5 indicates a state after the entire PM deposited within the cell-wall pores 15a is basically burned and removed. In this state, almost all the PM deposited in the DPF 13 exists on the cell-wall outer surface 15b. It is understood that, if the post-injection is continued from this state, PM remaining on the cell-wall outer surface 15b can be completely burned and removed during the stage from the point d to the point a, as indicated by the dashed line. However, in this embodiment, the post-injection is stopped at a timing corresponding to the point d. The reason for stopping the post-injection at the timing corresponding to the point d is that the PM on the cell-wall outer surface 15b where the DPF 13 is relatively hard to effectively bring out a burning performance thereof is left so as to suppress an increase in fuel consumption due to the post-injection, while maintaining a required performance of the DPF 13.

Specifically, it is considered that, even if the PM deposited on the cell-wall outer surface 15b still remains, an adverse effect of the DPF 13 on pressure loss and others is small, as compared with case where PM is deposited within the cell-wall pores 15a having an overwhelmingly narrow flow path and a relatively large surface area. In addition, the PM deposited on the cell-wall outer surface 15b is hard to promote an oxidation reaction (burning) as compared with the PM within the cell-wall pores 15a, as mentioned above. Thus, it is necessary to take much time for completely burning and removing the PM on the cell-wall outer surface 15b, as compared with a time required for burning the PM within the cell-wall pores 15a. In FIG. 5, a change in the PM deposit amount in the case of burning and removing the entire deposited PM including the PM on the cell-wall outer surface 15b is represented by the dashed line. As seen in FIG. 5, a time T2 of the stage d→a for burning of the PM on the cell-wall outer surface 15b becomes greater than a time T1 of the stages b→c→d for burning of the PM within the cell-wall pores 15a, because the PM on the cell-wall outer surface 15b is relatively hard to be burned, as mentioned above. Thus, if it is attempted to burn the PM on the cell-wall outer surface 15b which is relatively hard to be burned, by means of the post-injection, a duration time of the post-injection will be significantly extended, resulting in an increase in a required fuel amount (fuel consumption) by just that much. Therefore, in this embodiment, the post-injection is stopped in the state when the PM on the cell-wall outer surface 15b still remains, so as to suppress a fuel injection amount required for the post-injection, while maintaining a required performance of the DPF 13.

The new knowledge that the PM deposited on the cell-wall outer surface 15b is harder to be burned, than the PM deposited within the cell-wall pores 15a, has been actually verified by the inventor of this application. Specifically, a core sample for rig evaluation was cut out from the DPF 13 which was interposed in an exhaust system of an engine, and subjected to a rig test designed such that a temperature of the core sample is raised while supplying given simulated exhaust gas to pass through the core sample, to allow PM to start burning, and then the supply of the simulated exhaust gas and the raising of the core sample temperature are stopped (i.e., the burning of the PM is interrupted) before the PM is completely burned. Then, PM in the core sample was checked. As a result, it was proven that PM deposited within the cell-wall pores 15a is substantially completely burned, whereas PM deposited on the cell-wall outer surface 15b remains without being completely burned. This shows that, when PM deposited in a particulate filter is burned, PM within the cell-wall pores 15a having an overwhelmingly large contact surface with an oxidation catalyst is first burned (first stage), and subsequently PM on a cell-wall outer surface 15b is burned (second stage). Then, the inventor found a fact that respective characteristics in the first and second stages, for example, in terms of a reduction rate of the pressure difference across the DPF 13 (DPF pressure difference), are different from each other, and finally reached the present invention.

After the post-injection is stopped at the point d, PM starts to be deposited again, wherein the PM deposit amount is gradually increased during the stage d→b. Then, when the PM deposit amount reaches the predetermined value X, and the DPF 13 is placed in a state indicated by the point b, the post-injection is performed again, so that PM deposited in the DPF 13 is burned and removed during the stages b→c→d. As above, in this embodiment, the filter regeneration process is executed in such a manner that the state of the DPF 13 is cycled in order of point b→point c→point d→point b.

In a course where the above filter regeneration process is repeatedly executed, when the control operation of stopping or interrupting the post-injection at the timing corresponding to the point d, i.e., the control operation of interrupting the post-injection in a stage where the amount of PM burned and removed through the filter regeneration process (i.e., PM burning amount) is less than the PM deposit amount at the timing of initiation of the filter regeneration process (i.e., initial PM deposit amount X), by a predetermined amount, is repeated plural times, a total amount of PM deposited on the cell-wall outer surface 15b in the DPF 13 is gradually increased, which is likely to exert a negative effect on performance of the DPF 13. Therefore, in this embodiment, in the next filter regeneration process after the above control operation is repeated predetermined plural times, the post-injection is continued until PM deposited in the initial PM deposit amount X is substantially completely burned and removed.

A polygonal line on a rightmost side of FIG. 5 represents a change in the PM deposit amount during execution of the above process. As seen in this polygonal line, the post-injection is continued until the point a where the PM deposit amount becomes approximately zero, i.e., until the entire deposited PM including PM remaining on the cell-wall outer surface 15b is substantially completely burned and removed. In the following description, the above process of substantially completely burning the entire PM deposited in the DPF 13 will be referred to as "complete filter regeneration process". Differently, as represented by the remaining polygonal line in FIG. 5, the process of burning primarily only the PM deposited within the cell-wall pores 15a by interrupting the post-injection in the state when a part of the deposited PM still remains will be referred to as "normal filter regeneration process".

Further, in this embodiment, in the complete filter regeneration process, a fuel injection amount for the post-injection is increased as compared with that in the normal filter regeneration process configured to interrupt the post-injection in the state when a part of the deposited PM still remains. Thus, an amount of unburned fuel components in exhaust gas is increased, so that an oxidation reaction of the unburned fuel components is positively promoted to raise an exhaust gas temperature to a higher value, and thereby a PM burning rate is increased. This is a reason why, in FIG. 5, a time T1'+T2' required for completely burning the PM through the complete filter regeneration process is reduced as compared with a time T1+T2 required for completely burning the PM through the normal filter regeneration process.

Figure 6:
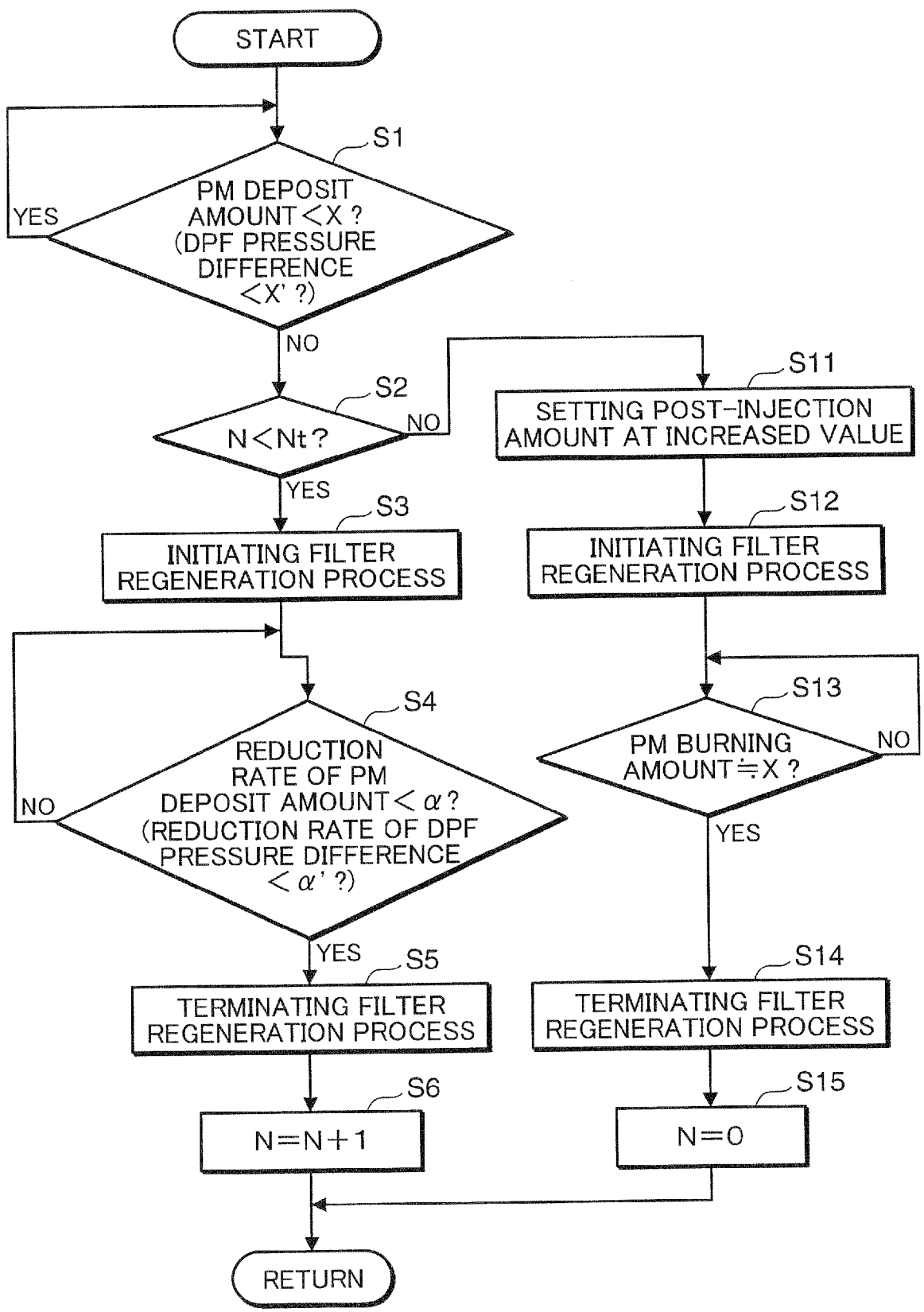
FIG. 6 is a flowchart showing a specific content of a control operation to be performed by the particulate filter regenerating system.

Based on the flowchart in FIG. 6, a specific content of a control operation to be performed by the injector control section 33 for governing control of the above filter regeneration process will be described below. Upon starting of a processing routine illustrated in the flowchart, the injector control section 33 first executes a processing of determining whether an amount of PM deposited in the DPF 13 (PM deposit amount) is less than the predetermined threshold value X (Step S1).

Specifically, the determination on whether the PM deposit amount is less than the predetermined threshold value X, is performed by acquiring a pressure difference across the DPF 13 (DPF pressure difference) from the pressure-difference detection section 32, and checking a level of a value of the acquired DPF pressure difference. In this case, the determination on whether the PM deposit amount is less than the predetermined threshold value X, can be made by determining whether the DPF pressure difference to be increased in proportion to the PM deposit amount is less than a predetermined threshold value (e.g., X') corresponding to the predetermined threshold value X.

More specifically, the determination in Step S1 is performed by acquiring the DPF pressure difference from the pressure-difference detection section 32 while acquiring state quantities (engine speed, engine load, etc.) indicative of a current operating condition, from various sensors, and comparing a value of the acquired DPF pressure difference with threshold-value data (i.e., data about the threshold value X') stored in the data storage section 34 in the form of a map classified on an operating condition-by-operating condition basis.

If the determination in Step S1 is NO, i.e., it is determined that the PM deposit amount reaches the threshold value X, the injector control section 33 executes a processing of determining whether the number N of executions of the filter regeneration process (process of burning deposited PM by means of the post-injection) to be executed in after-mentioned Step S3 is less than a predetermined plural number Nt (e.g., about ten to several dozen) (Step S2).

If the determination in Step S2 is YES, i.e., it is determined that the number N of executions of the filter regeneration process is less than the threshold value Nt, the injector control section 33 causes the injector 7 to perform the post-injection for injecting fuel during the expansion stroke of the engine, so as to initiate the filter regeneration process of raising a temperature of exhaust gas flowing into the DPF 13 to burn the PM deposited in the DPF 13 (Step S3).

Then, the injector control section 33 executes a processing of determining whether a reduction rate of the PM deposit amount in a course where the deposited PM is burned through the filter regeneration process, is less than a predetermined threshold value α, so as to determine whether the filter regeneration process should be stopped (Step S4). This determination processing is intended to determine whether the DPF 13 is placed in a state corresponding to the point d illustrated in FIGS. 4 and 5, i.e., whether PM deposited within the cell-wall pores 15a (see FIG. 3) is substantially completely burned.

Specifically, in the state corresponding to the point d illustrated in FIGS. 4 and 5, the PM deposited within the cell-wall pores 15a is substantially completely burned, and the deposited PM in the DPF 13 remains only on the cell-wall outer surface 15b, as mentioned above, so that the PM burning rate (reduction rate of the PM deposit amount) becomes relatively lower. Therefore, when the reduction rate of the PM deposit amount becomes less than the threshold value α, the injector control section 33 determines that the DPF 13 is placed in the state corresponding to the point d where the filter regeneration process should be stopped. For example, the threshold value α is set to a reduction rate having a gradient which is approximate intermediate between respective gradients in the stage c→d and the stage d→a.

The above determination on whether the reduction rate of the PM deposit amount becomes less than the threshold value α, can be made by acquiring the DPF pressure difference from the pressure-difference detection section 32, and checking a temporal change in the acquired DPF pressure difference. Specifically, a timing at which a reduction rate (temporal change rate) of the DPF pressure difference to be changed in response to a change in the PM deposit amount becomes less than a predetermined threshold value (e.g., α') corresponding to the threshold value α, may be identified and set as a timing at which the reduction rate of the PM deposit amount becomes less than the threshold value α.

Specifically, the above determination in Step S4 is performed by acquiring the DPF pressure difference from the pressure-difference detection section 32 while acquiring state quantities indicative of a current operating state from various sensors, calculating the reduction rate (temporal change rate) of the acquired DPF pressure difference, and comparing the calculated value of the reduction rate with threshold-value data (i.e., data about the threshold value α') stored in the data storage section 34 in the form of a map classified on an operating condition-by-operating condition basis.

If the determination in Step S4 is YES, i.e., it is determined that the reduction rate of the PM deposit amount is less than the threshold value α, or the PM within the cell-wall pores 15a is substantially completely burned, the injector control section 33 executes a processing of causing the injector 7 to stop performing the post-injection so as to terminate the filter regeneration process (Step S5). Then, after the injector control section 33 executes a processing of incrementing the number N of executions of the filter regeneration process by one (Step S6), the routine returns to Step S1.

A control operation to be performed when the determination in Step S2 is NO, i.e., the number N of executions of the filter regeneration process reaches the threshold value Nt, will be described below. In this case, the routine shifts to Step S11, and the injector control section 33 executes a processing of setting an amount of fuel to be injected from the injector 7 during the filter regeneration process (post-injection amount), at a value which is greater than that during the normal filter regeneration process to be executed at Steps S3 to S5, by a predetermined amount. Then, the injector control section 33 controls the injector 7 to initiate the post-injection under a condition that the post-injection amount is set at the increased value, so as to burn and remove the PM deposited in the DPF 13 (Step S12). Based on the post-injection amount set at the increased amount, an exhaust gas temperature is further raised as compared with the normal filter regeneration process to be executed at Steps S3 to S5, and thereby the PM deposited in the DPF 13 is burned and removed at a relatively high PM burning rate.

Then, the injector control section 33 executes a processing of determining whether an amount of PM burned through the filter regeneration process (PM burning amount) becomes approximately equal to the PM deposit amount at a timing of initiation of the filter regeneration process (initial PM deposit amount) (Step S13). The determination in Step S13 is performed by adding a given error to a value of the DPF pressure difference in a state when the PM deposit amount is zero, to obtain a target DPF pressure difference, and determining whether the DPF pressure difference input from the pressure-difference detection section 32 becomes equal to or less than the target DPF pressure difference. The target DPF pressure is stored the data storage section 34 in the form of a map classified on an operating condition-by-operating condition basis.

If the determination in Step S13 is YES, i.e., it is determined that the PM deposited in the DPF 13 is substantially completely burned and removed, the injector control section 33 executes a processing of causing the injector 7 to stop performing the post-injection so as to terminate the filter regeneration process (Step S14). As above, in Steps S12 to S14, the injector control section 33 executes the complete filter regeneration process of causing the fuel injector 7 to continuously perform the post-injection until the PM burning amount becomes approximately equal to the initial PM deposit amount X, so as to substantially completely burn and remove the PM deposited in the DPF 13. Then, after termination of the complete filter regeneration process, the number N of executions of the filter regeneration process is reset to "0" (Step S15). Then, the routine returns to Step S1.

As described above, the particulate filter regenerating system according to the above embodiment comprises an injector 7 (fuel injection device) adapted to inject fuel into a combustion chamber of an engine body 1, and an injector control section 33 (exhaust gas temperature-adjusting device) adapted, when a PM deposit amount, i.e., an amount of PM deposited in a DPF 13 (particulate filter) provided in an exhaust passage 5 of an engine, reaches a predetermined value X, to cause the injector 7 to perform a post-injection for injecting fuel into the combustion chamber during an expansion stroke of the engine, so as to execute a filter regeneration process of raising a temperature of exhaust gas flowing into the DPF 13 to burn the deposited PM. The injector control section 33 is operable to cause the injector 7 to stop performing the post-injection in a stage where a PM burning amount, i.e., an amount of PM burned through the filter regeneration process, is less than an initial PM deposit amount, i.e., the PM deposit amount X at a timing of initiation of the filter regeneration process, by a predetermined amount (in the above embodiment, the post-injection is stopped at a timing corresponding to the point d in FIGS. 4 and 5). This particulate filter regenerating system has an advantage of being able to adequately burn and remove the PM deposited in the DPF 13, by means of the post-injection, while effectively suppressing a fuel consumption due to the post-injection.

Specifically, in the above embodiment, the post-injection is interrupted before the PM deposited in the DPF 13 is completely burned. This makes it possible to terminate the filter regeneration process, in a state when a part of the deposited PM consisting of PM deposited within cell-wall pores 15a and on a cell-wall outer surface 15b of the DPF 13, i.e., primarily only the PM on the cell-wall outer surface 15b which is relatively hard to be burned, for example, due to a relatively small contact area with an oxidation catalyst of the DPF 13, still remains. This technique of stopping the post-injection intentionally in the state when the PM on the cell-wall outer surface 15b still remains provides an advantage of being able to efficiently burn and remove the deposited PM while adequately ensuring a PM burning effect based on the post-injection, and further reduce a time required for the post-injection to effectively suppress a post-injection amount (fuel consumption), differently, for example, from a technique of causing the injector 7 to continuously perform the post-injection for a longer period of time to completely burn the PM on the cell-wall outer surface 15b.

In this case, although the number of executions of the filter regeneration process is inevitably increased, the number of executions of a process of approximately completely burning the entire deposited PM including the PM remaining on the cell-wall outer surface 15b (complete filter regeneration process) can be drastically reduced to suppress the consumption of fuel required for the post-injection in totality. This provides an advantage of being able to efficiently burn and remove the PM deposited in the DPF 13, by means of the post-injection, while reducing a fuel consumption due to the post-injection to effectively improve fuel economy performance.

Particularly, in the above embodiment, the injector control section 33 is operable, when a reduction rate of the PM deposit amount during a course of burning of the deposited PM through the filter regeneration process becomes less than a predetermined value (threshold value α), to cause the injector 7 to stop performing the post-injection. Thus, a timing at which the PM within the cell-wall pores 15a in the PM deposited in the DPF 13 is substantially completely burned and removed (a timing corresponding to the point d in FIGS. 4 and 5) can be adequately found out to stop the post-injection at this timing. This provides an advantage of being able to effectively prevent deterioration in fuel economy performance due to excessive fuel consumption for burning and removing the PM remaining on the cell-wall outer surface 15b, while efficiently burning and removing the PM within the cell-wall pores 15a which is relatively easy to be burned, to adequately regenerate the DPF 13.

Further, in the above embodiment, the injector control section 33 is operable to check a pressure difference across the DPF 13 (DPF pressure difference), based on detection values of pressure sensors 21, 22 adapted to detect respective pressures of exhaust gases flowing on an upstream side and on a downstream side of the DPF 13, and identify a timing at which the reduction rate of the PM deposit amount becomes less than the predetermined value (threshold value α), based on a temporal change in the DPF pressure difference. This provides an advantage of being able to adequately set a timing of stopping the post-injection, using a relatively simple scheme of checking only the DPF pressure difference to be reduced along with a reduction in the PM deposit amount.

In the above particulate filter regenerating system, when a normal filter regeneration process (processing in Steps S3 to S5) configured to interrupt the post-injection in the stage where the PM burning amount is less than the initial PM deposit amount by the predetermined amount, is repeated plural times, PM deposited on the cell-wall outer surface 15b will remain in a cake-like (sponge-like) form, which would prevent PM from entering the cell-wall pores 15a to cause deterioration in regenerating efficiency.

In view of this problem, the injector control section 33 of the above embodiment is operable, in the next filter regeneration process after a normal filter regeneration process (processings in Steps S3 to S5) configured to interrupt the post-injection in the stage where the PM burning amount is less than the initial PM deposit amount by the predetermined amount, is repeated predetermined plural times (Nt times), to execute a complete filter regeneration process (processings in Steps S12 to S14) of causing the injector 7 to continuously perform the post-injection until the PM burning amount becomes approximately equal to the initial PM deposit amount. This provides an advantage of being able to effectively prevent an excessive increase in PM left and deposited on the cell-wall outer surface 15b without being burned in each filter regeneration process, so as to avoid deterioration in regeneration efficiency of the DPF 13 to adequately maintain a required performance of the DPF 13 over a long period of time.

Particularly, in the above embodiment, the injector control section 33 is operable, upon execution of the complete filter regeneration process, to increase a post-injection amount from the injector 7 in such a manner that a temperature of exhaust gas flowing into the DPF 13 becomes greater than that during the normal filter regeneration process. This provides an advantage of being able to effectively reduce a time required for regeneration of the DPF 13 even in the complete filter regeneration process of substantially completely burning the entire PM deposited in the DPF 13. Further, in the normal filter regeneration process to be frequently executed, the exhaust gas temperature is set at a relatively low value. This provides an advantage of being able to effectively protect the DPF 13 from thermal damage or the like to enhance durability of the DPF 13.

In the above embodiment, the injector control section 33 is operable, in the next filter regeneration process after the normal filter regeneration process (processings in Steps S3 to S5) is repeated the predetermined plural times (Nt times), to execute the complete filter regeneration process (processings in Steps S12 to S14) of causing the injector 7 to continuously perform the post-injection until the PM burning amount becomes approximately equal to the initial PM deposit amount, so as to prevent deterioration in regeneration efficiency of the DPF 13 due to an excessive increase in PM left and deposited during the normal filter regeneration process, as mentioned above. Alternatively, for the same purpose, the following configuration may be employed.

If PM left on the cell-wall outer surface 15b of the DPF 13 is excessively deposited, the resulting PM will remain in a cake-like (sponge-like) form, which would prevent rapid burning of PM within the cell-wall pores 15a in an early stage of the filter regeneration process, so that a reduction rate of the PM deposit amount becomes relatively lower, as indicated by the two-dot chain line L in FIG. 5. Therefore, the injector control section 33 may be configured execute the complete filter regeneration process when the reduction rate of the PM deposit amount in the earlier stage of the filter regeneration process becomes less than a predetermined value. This provides an advantage of being able to adequately detect a deterioration in regeneration efficiency due to repetition of the normal filter regeneration process, based on a temporal change in the reduction rate of the PM deposit amount, and completely burn the PM deposited in the DPF 13 at the detected timing so as to effectively maintain the required performance of the DPF 13.

Further, in the above embodiment, the injector control section 33 is operable, during the normal filter regeneration process, to check the DPF pressure difference based on detection values of the pressure sensors 21, 22, and identify a timing at which the reduction rate of the PM deposit amount becomes less than the predetermined value (threshold value α), based on a temporal change in the DPF pressure difference, to stop the post-injection at the identified timing, as mentioned above. Alternatively, the timing of stopping the post-injection may be identified in a different manner. For example, as indicated by the two-dot chain line in FIG. 1, a temperature sensor 23 may be provided on the downstream side of the DPF 13 to identify the timing of stopping the post-injection, based on a temporal change in exhaust gas temperature detected by the temperature sensor 23.

Specifically, as PM to be burned after initiation of the post-injection is deposited in the DPF 13 in a larger amount, a temperature of exhaust gas flowing on the downstream side of the DPF 13 becomes higher. Thus, the downstream-side exhaust gas temperature which is increased in proportion to the PM deposit amount (in other words, reduced along with a reduction in the PM deposit amount) can be checked to adequately find out a timing at which the reduction rate of the PM deposit amount becomes less than the predetermined value (e.g., a timing corresponding to the point d in FIGS. 4 and 5), based on a reduction rate (temporal change rate) of the downstream-side exhaust gas temperature, whereafter the post-injection can be stopped at the timing. This makes it possible efficiently regenerate the DPF 13 while allowing the PM on the cell-wall outer surface 15b to remain.

Further, in the above embodiment, the injector control section 33 is operable to determine whether the reduction rate of the PM deposit amount becomes less than the threshold value α, so as to identify a timing corresponding to the point d in FIGS. 4 and 5, i.e., a timing at which the PM within the cell-wall pores 15a in the PM deposited in the DPF 13 is substantially completely burned and removed, and stop the post-injection at this timing, as mentioned above. Alternatively, the threshold value α may be set at a different value in such a manner as to allow the injector control section 33 to identify a timing corresponding to the point c in FIGS. 4 and 5, i.e., a timing at which a small amount of PM remaining within the cell-wall pores 15a and a part of the PM deposited on the cell-wall outer surface 15b starts to be simultaneously burned, and stop the post-injection at this timing.

However, there is a possibility that the reduction rate of the PM deposit amount at the point c (i.e., a gradient in the stage c→d) does not have sufficiently large difference from that in the stage b→c where only PM within the cell-wall pores 15a is burned. Thus, depending on a variation in the change rate and other factor, the above approach is likely to have difficulty in identifying a timing corresponding to the point c with stable accuracy. In view of such a risk, it can be said that the technique of identifying the timing corresponding to the point d at which the PM within the cell-wall pores 15a is substantially completely burned and stopping the post-injection at this timing, as in the above embodiment, is preferable in terms of an ability to determine the timing of stopping the post-injection, with stable accuracy.

In the last place, features and advantages of the present invention disclosed based on the above embodiment will be described in a summarized manner.

The present invention provides a particulate filter regenerating system which comprises a fuel injection device adapted to inject fuel into a combustion chamber of an engine, and an exhaust gas temperature-adjusting device adapted, when a PM deposit amount which is an amount of particulate matter (PM) deposited in a particulate filter provided in an exhaust passage of the engine, reaches a predetermined value, to cause the fuel injection device to perform a post-injection for injecting fuel into the combustion chamber during an expansion stroke of the engine, so as to execute a filter regeneration process of raising a temperature of exhaust gas flowing into the particulate filter to burn the deposited PM, wherein the exhaust gas temperature-adjusting device is operable to cause the fuel injection device to stop performing the post-injection in a stage where a PM burning amount which is an amount of PM burned through the filter regeneration process, is less than an initial PM deposit amount which is the PM deposit amount at a timing of initiation of the filter regeneration process, by a predetermined amount.

In the particulate filter regenerating system of the present invention, the post-injection is interrupted before the PM deposited in the particulate filter is completely burned. This makes it possible to terminate the filter regeneration process, in a state when a part of the deposited PM consisting of PM deposited within cell-wall pores and on a cell-wall outer surface of the particulate filter, i.e., primarily only the PM on the cell-wall outer surface which is relatively hard to be burned, for example, due to a relatively small contact area with an oxidation catalyst of the particulate filter, still remains. This technique of stopping the post-injection in the state when the PM on the cell-wall outer surface still remains provides an advantage of being able to efficiently burn and remove the deposited PM while adequately ensuring a PM burning effect based on the post-injection, and further reduce a time required for the post-injection to effectively suppress a post-injection amount (fuel consumption), differently, for example, from a technique of causing the fuel injection device to continuously perform the post-injection for a longer period of time to completely burn the PM on the cell-wall outer surface.

Preferably, the exhaust gas temperature-adjusting device is operable, when a reduction rate of the PM deposit amount during a course of burning of the deposited PM through the filter regeneration process becomes less than a predetermined value, to cause the fuel injection device to stop performing the post-injection.

According to this feature, a timing at which a part of PM accumulated in the particulate filter, e.g., the PM within the cell-wall pores, is substantially completely burned and removed can be adequately found out to stop the post-injection at this timing. This provides an advantage of being able to effectively prevent deterioration in fuel economy performance due to excessive fuel consumption for burning and removing the PM remaining on the cell-wall outer surface, while efficiently burning and removing the PM within the cell-wall pores which is relatively easy to be burned, to adequately regenerate the particulate filter.

When the particulate filter regenerating system comprises a pressure sensor adapted to detect respective pressures of exhaust gases flowing on an upstream side and on a downstream side of the particulate filter, it is preferable that the exhaust gas temperature-adjusting device is operable to check a pressure difference across the particulate filter, based on detection values of the pressure sensor, and identify a timing at which the reduction rate of the PM deposit amount becomes less than the predetermined value, based on a temporal change in the pressure difference across the particulate filter.

This feature provides an advantage of being able to adequately set a timing of stopping the post-injection, using a relatively simple scheme of checking only the pressure difference across the particulate filter to be reduced along with a reduction in the PM deposit amount.

Alternatively, when the particulate filter regenerating system comprises a temperature sensor adapted to detect a temperature of exhaust gas flowing on a downstream side of the particulate filter, it is preferable that the exhaust gas temperature-adjusting device is operable to identify a timing at which the reduction rate of the PM deposit amount becomes less than the predetermined value, based on a temporal change in exhaust gas temperature detected by the temperature sensor.

This feature also provides an advantage of being able to adequately set a timing of stopping the post-injection, using a relatively simple scheme of checking only the exhaust gas temperature on the downstream side of the particulate filter to be reduced along with a reduction in the PM deposit amount.

In the prevent invention, it is preferably that the exhaust gas temperature-adjusting device is operable, in the next filter regeneration process after a normal filter regeneration process configured to interrupt the post-injection in the stage where the PM burning amount is less than the initial PM deposit amount by the predetermined amount, is repeated plural times, to execute a complete filter regeneration process of causing the fuel injection device to continuously perform the post-injection until the PM burning amount becomes approximately equal to the initial PM deposit amount.

This feature provides an advantage of being able to burn and remove the PM on the cell-wall outer surface which is relatively hard to be burned, so as to adequately eliminate a factor causing a deterioration in regeneration efficiency to adequately maintain a required performance of the particulate filter over a long period of time.

More preferably, the exhaust gas temperature-adjusting device is operable, when a reduction rate of the PM deposit amount in an earlier stage of the filter regeneration process becomes less than a predetermined value, to execute the complete filter regeneration process.

This feature provides an advantage of being able to adequately detect a deterioration in regeneration efficiency due to repetition of the normal filter regeneration process, based on a temporal change in the reduction rate of the PM deposit amount, and completely burn the PM deposited in the particulate filter at the detected timing so as to effectively maintain the required performance of the particulate filter.

Preferably, in the above particulate filter regenerating system, the exhaust gas temperature-adjusting device is operable, upon execution of the complete filter regeneration process, to control the fuel injection device in such a manner that a temperature of exhaust gas flowing into the particulate filter becomes greater than that during the normal filter regeneration process.

This feature provides an advantage of being able to effectively reduce a time required for regeneration of the particulate filter even in the complete filter regeneration process of substantially completely burning the entire PM deposited in the particulate filter.

This application is based on the Japanese Patent Application Serial No. 2008-189533 filed in Japan Patent Office on Jul. 23, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A particulate filter regenerating system comprising:
a fuel injection device adapted to inject fuel into a combustion chamber of an engine; and
an exhaust gas temperature-adjusting device adapted, when a PM deposit amount which is an amount of particulate matter deposited in a particulate filter having a plurality of cell walls with pores and outer surfaces and provided in an exhaust passage of the engine reaches a predetermined value, to cause the fuel injection device to perform a post-injection for injecting fuel into the combustion chamber during an expansion stroke of the engine, so as to execute a filter regeneration process of raising a temperature of exhaust gas flowing into the particulate filter to burn the deposited PM, and
a temperature sensor adapted to detect a temperature of exhaust gas flowing on a downstream side of the particulate filter,
wherein the exhaust gas temperature-adjusting device is operable to identify a timing at which the reduction rate of the PM deposit amount becomes less than the predetermined value, based on a temporal change in exhaust gas temperature detected by the temperature sensor,
wherein the exhaust gas temperature-adjusting device is operable to perform a normal filter regeneration process which includes:
a first stage which causes the fuel injection device to perform the post-injection to primarily burn and remove the PM within the cell-wall pores in the particulate filter until the reduction rate of the PM deposit amount becomes less than the first threshold value; and
a second stage which causes the fuel injection device to perform the post-injection to simultaneously burn and remove a remaining PM within the cell-wall pores and a part of the PM deposited on the cell-wall outer surface of the particulate filter until the reduction rate of the PM deposit amount becomes less than the second threshold value,
wherein the exhaust gas temperature-adjusting device is operable, after repeating said normal filter regeneration process a predetermined number of times, to perform a complete filter regeneration process which causes the fuel injection device to continuously perform the post-injection until the PM burning amount becomes approximately equal to the initial PM deposit amount.

2. The particulate filter regenerating system as defined in claim 1, wherein the exhaust gas temperature-adjusting device is operable, upon execution of the complete filter regeneration process, to control the fuel injection device in such a manner that a temperature of exhaust gas flowing into the particulate filter becomes greater than that during the normal filter regeneration process.

3. A particulate filter regenerating system comprising:
a fuel injection device adapted to inject fuel into a combustion chamber of an engine; and
an exhaust gas temperature-adjusting device adapted, when a PM deposit amount which is an amount of particulate matter deposited in a particulate filter having a plurality of cell walls with pores and outer surfaces and provided in an exhaust passage of the engine reaches a predetermined value, to cause the fuel injection device to perform a post-injection for injecting fuel into the combustion chamber during an expansion stroke of the engine, so as to execute a filter regeneration process of raising a temperature of exhaust gas flowing into the particulate filter to burn the deposited PM, and
a pressure sensor adapted to detect respective pressures of exhaust gases flowing on an upstream side and on a downstream side of the particulate filter,
wherein the exhaust gas temperature-adjusting device is operable to check a pressure difference across the particulate filter, based on detection values of the pressure sensor, and identify a timing at which the reduction rate of the PM deposit amount becomes less than the predetermined value, based on a temporal change in the pressure difference across the particulate filter,
wherein the exhaust gas temperature-adjusting device is operable to perform a normal filter regeneration process which includes:
a first stage which causes the fuel injection device to perform the post-injection to primarily burn and remove the PM within the cell-wall pores in the particulate filter until the reduction rate of the PM deposit amount becomes less than the first threshold value; and
a second stage which causes the fuel injection device to perform the post-injection to simultaneously burn and remove a remaining PM within the cell-wall pores 15a and a part of the PM deposited on the cell-wall outer surface 15b of the particulate filter until the reduction rate of the PM deposit amount becomes less than the second threshold value,
wherein the exhaust gas temperature-adjusting device is operable, after repeating said normal filter regeneration process a predetermined number of times, to perform a complete filter regeneration process which causes the fuel injection device to continuously perform the post-injection until the PM burning amount becomes approximately equal to the initial PM deposit amount.

4. The particulate filter regenerating system as defined in claim 3, wherein the exhaust gas temperature-adjusting device is operable, upon execution of the complete filter regeneration process, to control the fuel injection device in such a manner that a temperature of exhaust gas flowing into the particulate filter becomes greater than that during the normal filter regeneration process.

\* \* \* \* \*